US 9,174,677 B2

(12) United States Patent
Takahashi et al.

(10) Patent No.: US 9,174,677 B2
(45) Date of Patent: Nov. 3, 2015

(54) AUTOMOBILE SUBFRAME

(71) Applicants: HONDA MOTOR CO., LTD., Minato-Ku, Tokyo (JP); F-TECH INC., Kuki-Shi, Saitama (JP)

(72) Inventors: Hayato Takahashi, Wako (JP); Norio Tomikuda, Tochigi (JP)

(73) Assignees: Honda Motor Co., Ltd., Tokyo (JP); F-Tech Inc., Saitama (JP)

( * ) Notice: Subject to any disclaimer, the term of this patent is extended or adjusted under 35 U.S.C. 154(b) by 0 days.

(21) Appl. No.: 14/357,818

(22) PCT Filed: Nov. 12, 2012

(86) PCT No.: PCT/JP2012/079273
§ 371 (c)(1),
(2) Date: May 13, 2014

(87) PCT Pub. No.: WO2013/073499
PCT Pub. Date: May 23, 2013

(65) Prior Publication Data
US 2014/0312655 A1    Oct. 23, 2014

(30) Foreign Application Priority Data

Nov. 15, 2011  (JP) ................................. 2011-250154

(51) Int. Cl.
*B62D 21/10* (2006.01)
*B62D 21/11* (2006.01)

(52) U.S. Cl.
CPC ................ *B62D 21/10* (2013.01); *B62D 21/11* (2013.01)

(58) Field of Classification Search
CPC .... B62D 21/11; B62D 21/10; B60G 2204/15; B60G 2206/0114; B60G 2206/60; B60G 2206/602; B60G 2206/604; B60G 2206/606; B60G 7/008; B60G 7/02
USPC ............ 180/312; 280/788, 124.109, 124.134; 296/193.07, 204; 29/897.2, 428
See application file for complete search history.

(56) References Cited

U.S. PATENT DOCUMENTS 5,573,274 A     11/1996  Koketsu
6,409,216 B2 *  6/2002   Suzuki .......................... 280/781
(Continued)

FOREIGN PATENT DOCUMENTS

JP    S62-3372 U    1/1987
JP    S62-173376 A  7/1987
(Continued)

*Primary Examiner* — Laura Freedman
(74) *Attorney, Agent, or Firm* — Carrier Blackman & Associates, P.C.; William D. Blackman; Joseph P. Carrier

(57) ABSTRACT

A joint part between a main body part of an automobile subframe and a suspension support member comprises a first joint part in which an upper plate is directly superimposed on and joined to the suspension support member, and a second joint part in which a lower plate is directly superimposed on and joined to the suspension support member, and since the first and second joint parts extend in the vehicle body fore-and-aft direction without overlapping each other, it becomes possible to directly transmit, to both the upper plate and the lower plate, a load that has been inputted from the suspension arm to the suspension support member, thus enhancing the joining strength of the main body part and the suspension support member. The upper plate and the lower plate are joined to the suspension support member from the same side.

5 Claims, 8 Drawing Sheets

(56) References Cited

U.S. PATENT DOCUMENTS

| | | | | |
|---|---|---|---|---|
| 6,494,472 | B2* | 12/2002 | Suzuki | 280/124.109 |
| 6,869,090 | B2* | 3/2005 | Tatsumi et al. | 280/124.109 |
| 7,097,185 | B2* | 8/2006 | Kato et al. | 280/124.109 |
| 7,654,543 | B2* | 2/2010 | Tanaka et al. | 280/124.109 |
| 7,883,113 | B2* | 2/2011 | Yatsuda | 280/784 |
| 8,720,919 | B2* | 5/2014 | Takahashi et al. | 280/124.109 |
| 2012/0319389 | A1 | 12/2012 | Takahashi et al. | |
| 2013/0249250 | A1* | 9/2013 | Ohhama et al. | 296/204 |
| 2014/0183895 | A1* | 7/2014 | Awano | 296/29 |

FOREIGN PATENT DOCUMENTS

| | | |
|---|---|---|
| JP | H02-54681 U | 4/1990 |
| JP | H04-215567 A | 8/1992 |
| JP | H07-179180 A | 7/1995 |
| JP | 2011-152911 A | 8/2011 |

* cited by examiner

AUTOMOBILE SUBFRAME

TECHNICAL FIELD

The present invention relates to an automobile subframe in which an outer edge, in a vehicle width direction, of a main body part formed from an upper plate and a lower plate superimposed on one another and inner edges, in the vehicle width direction, of a pair of suspension support members disposed on opposite sides, in the vehicle width direction, of the main body part are joined via a joint part extending in a fore-and-aft direction.

BACKGROUND ART

An automobile subframe in which an upper member made of a plate material and a lower member made of a plate material are joined so as to form a closed cross-section, and opposite end parts in the vehicle width direction thereof have an arm bracket for supporting a suspension arm joined thereto via a reinforcement is known from Patent Document 1 below.

RELATED ART DOCUMENTS

Patent Documents

Patent Document 1: Japanese Patent Application Laid-open No. 7-179180

SUMMARY OF THE INVENTION

Problems to be Solved by the Invention

When an automobile subframe is formed by joining a pair of suspension support members to opposite end parts in the vehicle width direction of a hollow main body part formed from an upper plate and a lower plate, as described in detail in the [Modes for Carrying Out the Invention] section of the present specification, if the upper plate and the lower plate are joined to an upper face and a lower face of the suspension support member respectively, although the joining strength increases, there is the problem that the work efficiency is degraded due to the necessity of turning the subframe upside down during the joining step, whereas if the upper plate and the lower plate are together joined to the upper face or lower face of the suspension support member, although the work efficiency improves due to there being no necessity of turning the subframe upside down during the joining step, there is the problem that sufficient joining strength cannot be obtained due to the necessity of joining together three layers, that is, the suspension support member, the upper plate, and the lower plate.

The present invention has been accomplished in light of the above circumstances, and it is an object thereof to enhance the efficiency of joining a suspension support member and an upper plate and lower plate forming a subframe while ensuring the joining strength.

Means for Solving the Problems

In order to attain the above object, according to a first aspect of the present invention, there is provided an automobile subframe in which outer edges, in a vehicle width direction, of a main body part formed from an upper plate and a lower plate superimposed on one another and inner edges, in the vehicle width direction, of a pair of suspension support members disposed on opposite sides, in the vehicle width direction, of the main body part are joined via a joint part extending in a fore-and-aft direction, wherein the joint part comprises a first joint part in which one of the upper plate and the lower plate is directly superimposed on and joined to the suspension support member, and a second joint part in which the other of the upper plate and the lower plate is directly superimposed on and joined to the suspension support member, and the first joint part and the second joint part extend in the vehicle body fore-and-aft direction without overlapping each other.

Further, according to a second aspect of the present invention, in addition to the first aspect, of the upper plate and the lower plate, an outer edge in the vehicle width direction of at least the plate that is closer to the suspension support member opposes a step portion formed on the suspension support member.

Furthermore, according to a third aspect of the present invention, in addition to the first or second aspect, front and rear edges of the upper plate and the lower plate are joined to each other via a third joint part extending in the vehicle width direction.

Moreover, according to a fourth aspect of the present invention, in addition to any one of the first to third aspects, the main body part is a hollow structure having a space between the upper plate and the lower plate.

Effects of the Invention

In accordance with the first aspect of the present invention, the automobile subframe is formed by joining the outer edge, in the vehicle width direction, of the main body part formed from the upper plate and lower plate superimposed on one another, and the inner edges, in the vehicle width direction, of the pair of suspension support members disposed on opposite sides, in the vehicle width direction, of the main body part via the joint part extending in the fore-and-aft direction. The joint part where the main body part and the suspension support member are joined is formed from the first joint part in which one of the upper plate and the lower plate is directly superimposed on and joined to the suspension support member, and the second joint part in which the other of the upper plate and the lower plate is directly superimposed on and joined to the suspension support member; since the first joint part and the second joint part extend in the vehicle body fore-and-aft direction without overlapping each other, it becomes possible to directly transmit, to both the upper plate and the lower plate, a load that has been inputted from the suspension to the suspension support member, thus enhancing the joining strength of the main body part and the suspension support member. Moreover, since the upper plate and the lower plate are joined to the suspension support member from the same side, it becomes unnecessary to reverse the attitude of the workpiece between a step of joining the upper plate to the suspension support member and a step of joining the lower plate to the suspension support member, thus improving the work efficiency.

Furthermore, in accordance with the second aspect of the present invention, since, of the upper plate and the lower plate, the outer edge, in the vehicle width direction, of at least the plate that is closer to the suspension support member opposes the step portion formed on the suspension support member, it is possible to prevent a step occurring between the suspension support member and the plate, thus enhancing the appearance.

Moreover, in accordance with the third aspect of the present invention, since the front and rear edges of the upper plate and lower plate are joined to each other via the third joint part extending in the vehicle width direction, it is possible to enhance the strength of the main body part of the subframe by means of the third joint part, which does not interfere with the first and second joint parts.

Furthermore, in accordance with the fourth aspect of the present invention, since the main body part of the subframe is a hollow structure having a space between the upper plate and the lower plate, it is possible to ensure, with a light-weight structure, that there is a strength that can withstand a load inputted from the suspension to the main body part via the suspension support member.

EXPLANATION OF REFERENCE NUMERALS AND SYMBOLS

12 Main body part
13 Suspension support member
13c Step portion
14 Upper plate
15 Lower plate
A First joint part
B Second joint part
C Third joint part Modes for Carrying Out the Invention A mode for carrying out the present invention is explained below by reference to FIG. 1 to FIG. 8.

First Embodiment

Figure 1:
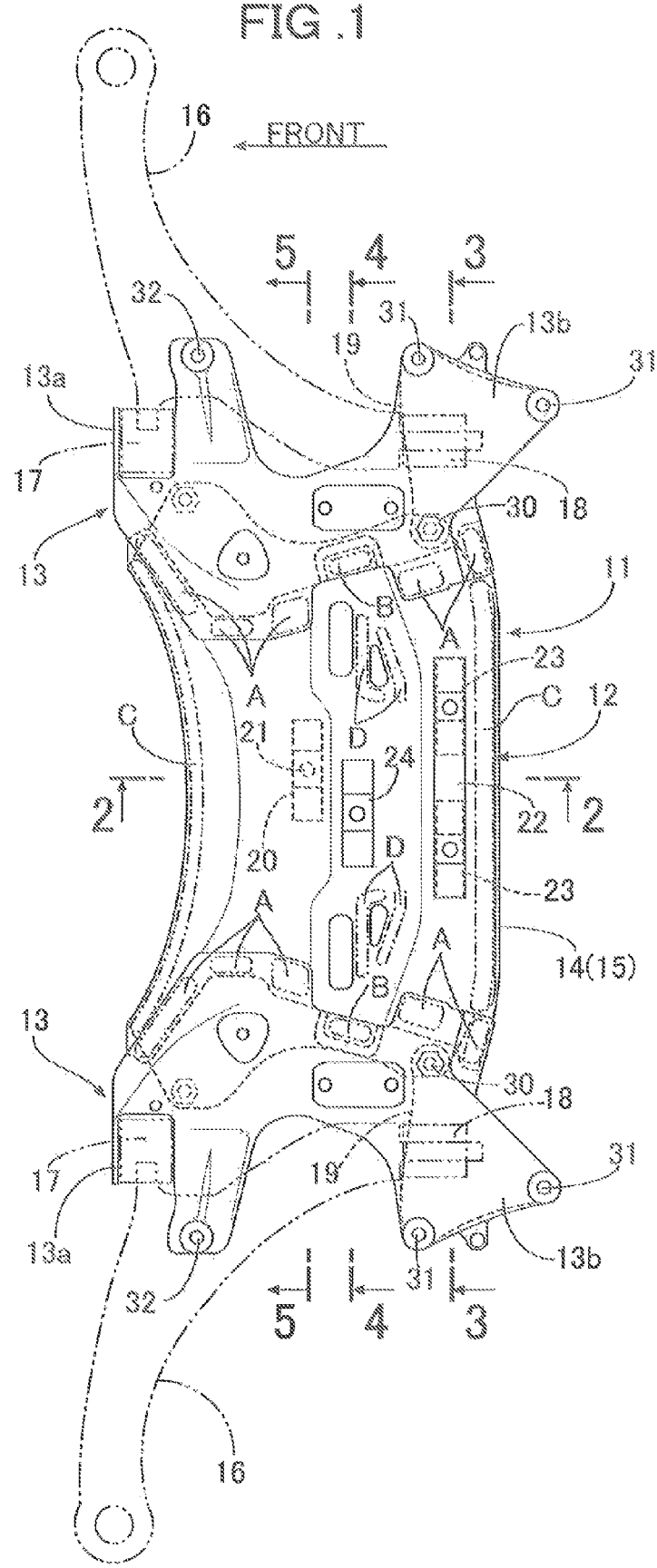
FIG. 1 is a plan view of a subframe. (first embodiment)
Figure 2:
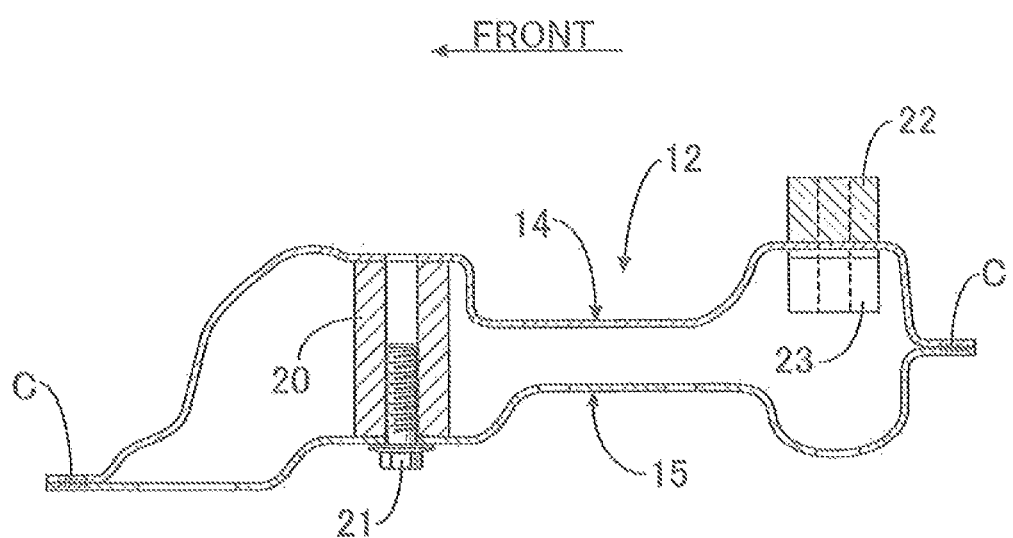
FIG. 2 is a sectional view along line 2-2 in FIG. 1. (first embodiment)
Figure 3:
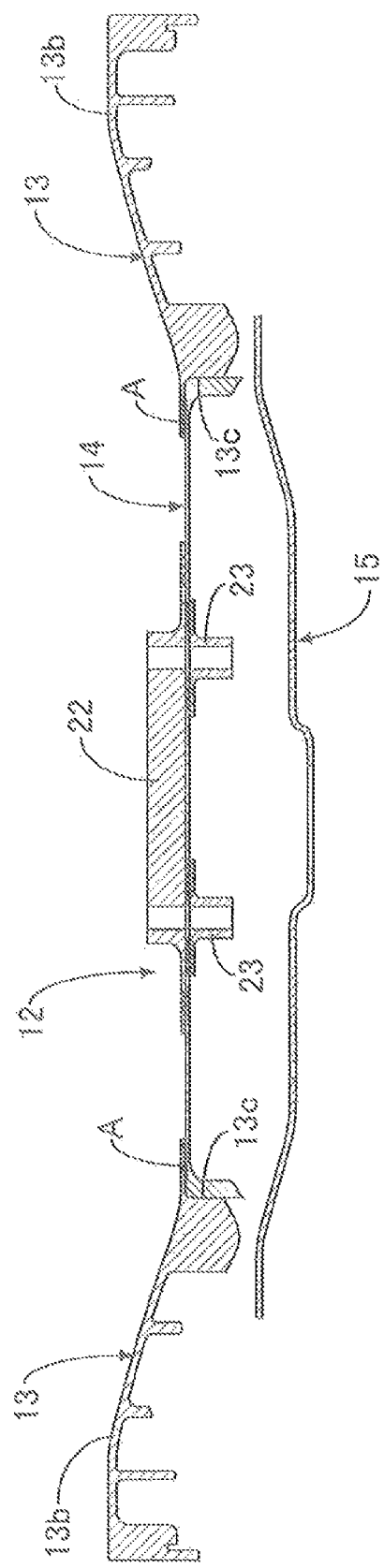
FIG. 3 is a sectional view along line 3-3 in FIG. 1. (first embodiment)
Figure 4:
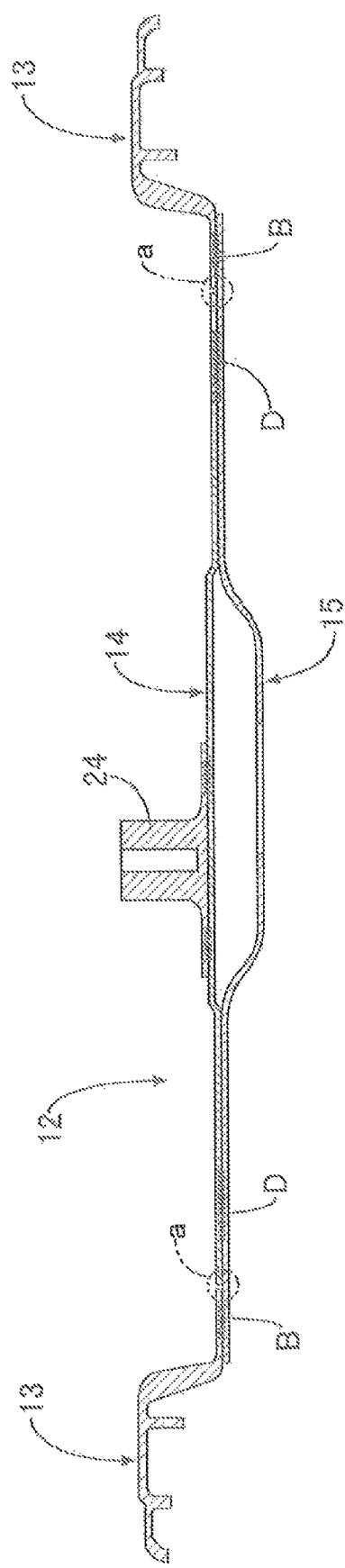
FIG. 4 is a sectional view along line 4-4 in FIG. 1. (first embodiment)
Figure 5:
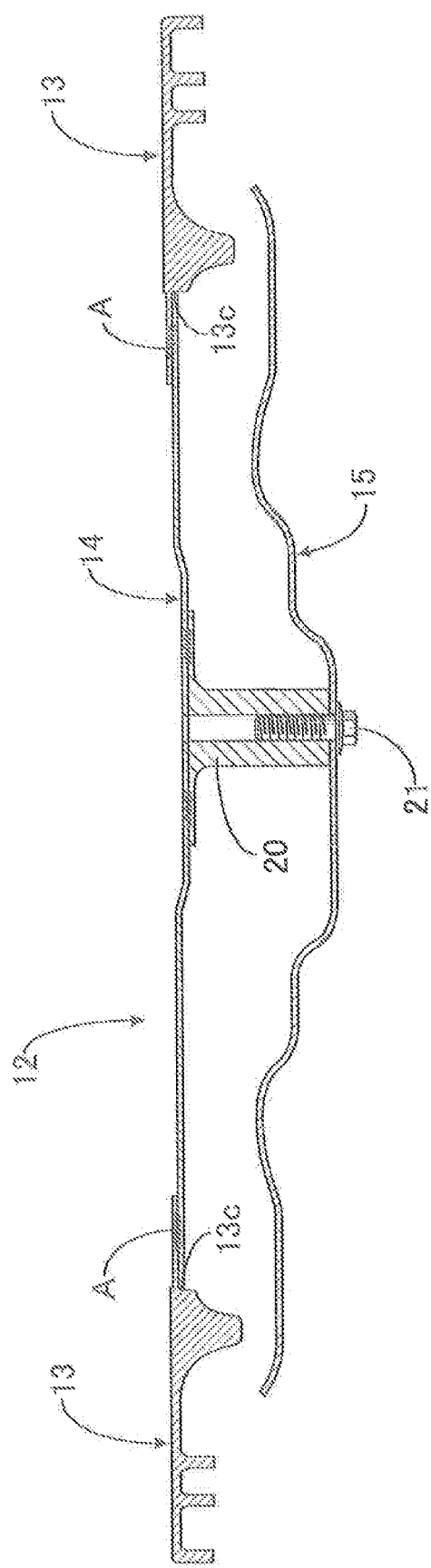
FIG. 5 is a sectional view along line 5-5 in FIG. 1. (first embodiment)

FIG. 1 is a plan view of a front subframe 11, which is to be mounted in a front part of a vehicle body of an automobile, when viewed from above. This subframe 11 is formed from a main body part 12 positioned in the middle in the vehicle width direction, and a pair of left and right suspension support members 13 and 13 joined to opposite sides, in the vehicle width direction, of the main body part 12. As is clear from FIG. 1 to FIG. 5, the main body part 12 is a part that supports for example a motor/generator (not illustrated) for travel, and has a hollow structure formed by joining an upper plate 14 on the upper side and a lower plate lower plate 15 on the lower side, which are press formed from a metal plate. The upper plate 14 and the lower plate 15 have a substantially identical outer shape except for opposite end parts in the vehicle width direction; in FIG. 1, a majority of the lower plate 15 is hidden beneath the upper plate 14.

The suspension support members 13 and 13 are die-castings made of aluminum, and since they have shapes that are symmetrical with respect to the vehicle body center plane the structure of one suspension support member 13 is explained below. A suspension arm 16 supported on the suspension support member 13 is an A-shaped arm, its front part is supported on a bifurcated front arm support portion 13a of the suspension support member 13 via a rubber bush joint 17, and its rear part is supported on a flat plate-shaped rear arm support portion 13b of the suspension support member 13 via a rubber bush joint 18. A joint holder 19 (see FIG. 7) is superimposed on a lower face of the rear arm support portion 13b, and the rubber bush joint 18 is fixed by being sandwiched between the rear arm support portion 13b and the joint holder 19.

A reinforcing member 20 (see FIG. 2 and FIG. 5) is fixed to a lower face of a middle part of the upper plate 14, and by tightening a bolt 21 extending upwardly through the lower plate 15 in a state in which the lower end of the reinforcing member 20 abuts against an upper face of the lower plate 15, the upper plate 14 and the lower plate 15 are connected to each other with the reinforcing member 20 sandwiched therebetween.

A rear mounting member 22 (see FIG. 2 and FIG. 3) is fixed to an upper face of a rear part of the upper plate 14, a pair of reinforcing members 23 and 23 (see FIG. 2 and FIG. 3) are fixed to a lower face of the upper plate 14 positioned beneath the rear mounting member 22, and a front mounting member 24 (see FIG. 4) is fixed to an upper face of a middle part of the upper plate 14. A rear part of the motor/generator (not illustrated) is supported on the rear mounting member 22 and the front mounting member 24.

Assembly steps for the subframe 11 are now explained.

The upper plate 14, lower plate 15 and suspension support members 13 and 13 of the subframe 11 are joined and assembled by means of friction-stir welding (FSW). Friction-stir welding carries out welding of superimposed workpieces by strongly pressing a cylindrical tool having a projection at the tip against the superimposed workpieces while rotating the tool, and making an area around the joint part plastically flow and be stirred by means of the rotational force of the tool while making the projection of the tool penetrate into the workpieces and generating frictional heat.

Figure 8:
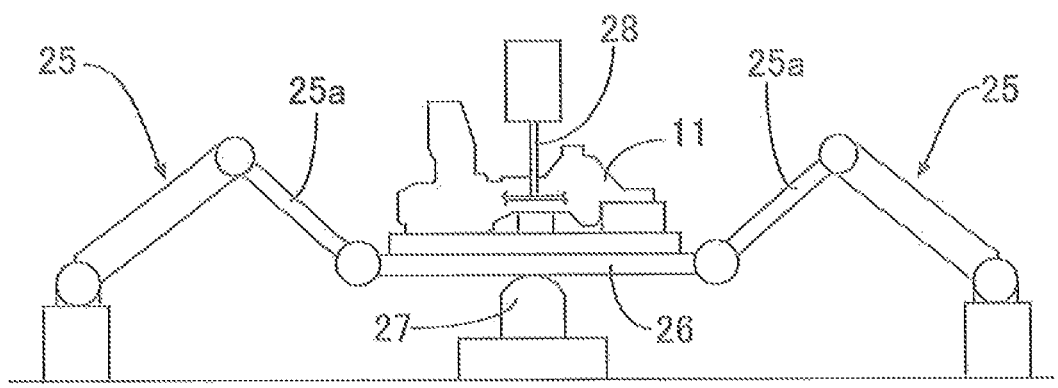
FIG. 8 is a schematic drawing of a device that carries out friction-stir welding. (first embodiment)

FIG. 8 is a schematic drawing of a device that carries out friction-stir welding. The subframe 11 as a workpiece is supported on a pallet 26 supported at the tips of arms 25a and 25a of two robots 25 and 25, and in a state in which a part to be processed of the workpiece is sandwiched from above and below by means of a pedestal 27 at a fixed position and a tool 28 at a fixed position, a joining operation is carried out while moving the pallet 26 by means of the robots 25 and 25. In the present embodiment, friction-stir welding is carried out while the subframe 11 is in an upside down attitude with respect to the state in which it is mounted on the vehicle.

Figure 6:
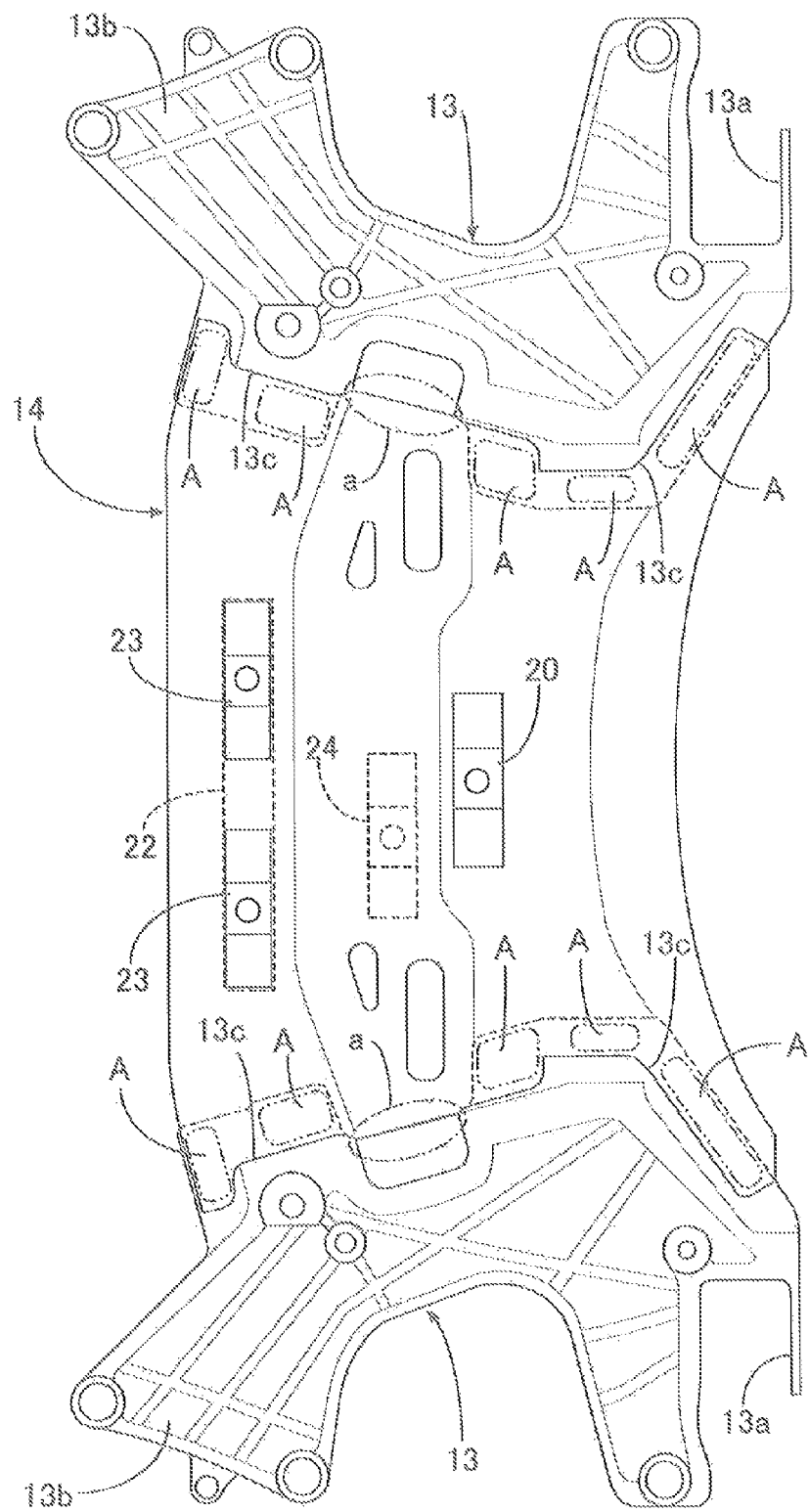
FIG. 6 is a diagram for explaining a first step. (first embodiment)

FIG. 6 shows a first step of assembly of the subframe 11. The left and right suspension support members 13 and 13 are supported on the pallet 26, and the upper plate 14 is placed on upper faces thereof. In a vehicle-mounted state the subframe 11 has the left and right suspension support members 13 and 13 on the uppermost side, and the upper plate 14 and the lower plate 15 are disposed therebeneath, but when being processed the suspension support member 13 is disposed on the lowermost side.

When an outer edge, in the vehicle width direction, of the upper plate 14 is superimposed from above on an upper face of an inner edge, in the vehicle width direction, of the suspension support member 13, superimposed parts are formed on the front side and the rear side, and an abutment part a is formed therebetween in which the upper plate 14 and the suspension support member 13 are abutted against each other so as to be flush. The abutment part a is shown encompassed by a chain line in FIG. 4 and FIG. 6. Three first joint parts A are formed in the front superimposed part, and two first joint parts A are formed in the rear superimposed part. These five first joint parts A (see FIG. 3, FIG. 5, and FIG. 6) are joined by friction-stir welding and are disposed in the fore-and-aft direction along the outer edge, in the vehicle width direction, of the upper plate 14. In a state in which the upper plate 14 is joined to the suspension support member 13, the outer edge, in the vehicle width direction, of the upper plate 14 opposes a step portion 13c (see FIG. 3, FIG. 5, and FIG. 6) formed on the suspension support member 13 from the inside in the vehicle width direction in portions other than the abutment part a.

Figure 7:
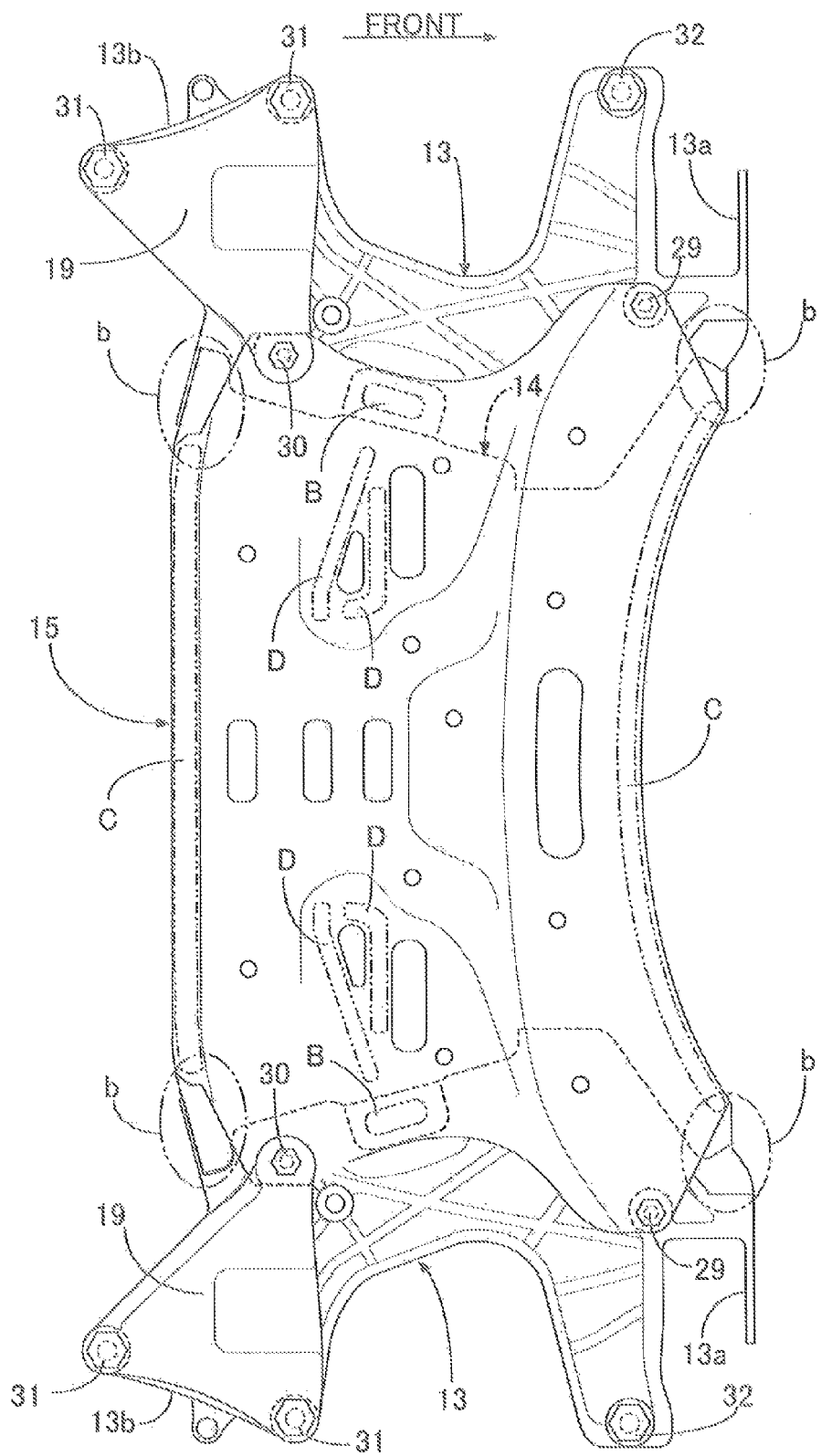
FIG. 7 is a diagram for explaining a second step and a third step. (first embodiment)

FIG. 7 shows a second step of assembly of the subframe 11. The lower plate 15 is superimposed on upper faces of the suspension support members 13 and 13 and upper plate 14, which have been joined in the first step. The outer shape of the outer edge, in the vehicle width direction, of the lower plate 15 is basically larger than the outer shape of the outer edge, in the vehicle width direction, of the upper plate 14; the first joint part A is completely covered and hidden by the lower plate 15, and only front and rear portions b of the upper plate 14 (see FIG. 7) protrude from the outer edge in the vehicle width direction of the lower plate 15. One each of second joint parts B (see FIG. 4 and FIG. 7) in which the lower plate 15 is friction-stir welded to the suspension support member 13 is provided on left and right positions on the outer side in the vehicle width direction of the abutment part a (see FIG. 6). The second joint parts B are positioned so as to be sandwiched between the three first joint parts A on the front side and the two first joint parts A on the rear side. Therefore, the first joint parts A and the second joint part B are aligned in the fore-and-aft direction.

The lower plate 15 is not only joined to the suspension support member 13 via the second joint part B but is also secured to the suspension support member 13 by means of two bolts 29 and 30 on each of the left and the right. That is, a front part of the lower plate 15 is secured to the suspension support member 13 by means of the bolt 29 and, among three bolts 30, 31, and 31 for fixing the joint holder 19 to the lower plate 15, a rear part of the lower plate 15 is together secured to the suspension support member 13 by means of one bolt 30.

The subframe 11 is fixed to a lower face of a front side frame (not illustrated) of the vehicle body by means of a total of four bolts 31 for fixing the left and right joint holders 19 and 19 to the suspension support member 13 and a total of two bolts 32 and 32 extending through left and right front parts of the suspension support member 13 (see FIG. 1).

In a subsequent third step, as shown in FIG. 7, a portion where two layers, that is, the upper plate 14 and the lower plate 15 superimposed on the upper face thereof, are superimposed are joined by friction-stir welding via a third joint part C and a fourth joint part D. The third joint part C (see FIG. 2 and FIG. 7) refers to a portion extending throughout the vehicle width direction along the front edge of the main body part 12 and a portion extending throughout the vehicle width direction along the rear edge of the main body part 12, and the main body part 12 is formed so as to have a closed cross-section by the third joint part C. The fourth joint part D (see FIG. 4 and FIG. 7) is disposed in a portion in which the upper plate 14 and the lower plate 15 are in contact with each other at two locations each on the left and the right of a middle part of the main body part 12.

If friction-stir welding were to be carried out in a state in which three layers are superimposed, that is, the upper plate 14 and the lower plate 15 were superimposed on the suspension support member 13, since a sufficient joining force would not be obtained, the strength of the subframe 11 might become insufficient. If friction-stir welding were to be carried out in a state in which three layers were superimposed, a load from the suspension support member 13 would be adequately transmitted to the upper plate 14, which would be directly joined to the suspension support member 13, but the load from the suspension support member 13 would not be adequately transmitted to the lower plate 15, which would be joined to the suspension support member 13 via the upper plate 14, and the load from the suspension support member 13 could not be transmitted evenly to the upper plate 14 and the lower plate 15, thereby resulting in the problem that the strength of the subframe 11 would be degraded.

In order to avoid this, carrying out friction-stir welding for two layers, that is, in a state in which the upper plate 14 is superimposed on an upper face of the suspension support member 13, and subsequently carrying out friction-stir welding for two layers, that is, in a state in which the lower plate 15 is superimposed on a lower face of the suspension support member 13 could be considered. However, in this case, it would be necessary to turn the attitude of the subframe 11 upside down after the first step, and there is therefore the problem that the work efficiency would be greatly lowered.

On the other hand, in accordance with the present embodiment, since in the first step the upper plate 14 is superimposed on and joined to the upper face of the suspension support member 13, and in the second step the lower plate 15 is superimposed on and joined to the upper face of the upper plate 14, it is unnecessary to turn the attitude of the subframe 11 upside down, thus greatly improving the work efficiency. Moreover, since the upper plate 14 is directly joined to the suspension support member 13, and the lower plate 15 is also directly joined to the suspension support member 13, the load from the suspension support member 13 can be transmitted evenly to the upper plate 14 and the lower plate 15, thus enhancing the strength of the subframe 11.

Furthermore, since the outer edge, in the vehicle width direction, of the upper plate 14 is made to oppose, from the inside to the outside in the vehicle width direction, the step portion 13c formed on the suspension support member 13, it is possible to prevent a step from occurring between the suspension support member 13 and the upper plate 14, thus enhancing the appearance.

Moreover, since a closed cross-section is formed by joining the upper plate 14 and the lower plate 15 to each other by means of the third joint part C and the fourth joint part D, which do not interfere with the first joint part A and the second joint part B, it is possible to form the main body part 12 of the subframe 11 as a closed cross-section without impairing the function of the first and second joint parts A and B, thus enhancing the strength.

An embodiment of the present invention is explained above, but the present invention may be modified in a variety of ways as long as the modifications do not depart from the spirit and scope thereof.

For example, in the embodiment friction-stir welding is employed for joining the suspension support member 13, the upper plate 14, and the lower plate 15, but another joining means such as welding may be employed.

Furthermore, in the embodiment the upper plate 14 and the lower plate 15 are joined to the lower face of the suspension support member 13, but they may be joined to an upper face of the suspension support member 13.

Moreover, in the embodiment only the upper plate 14 is made to oppose the step portion 13c of the suspension support member 13, but only the lower plate 15 or both the upper plate 14 and the lower plate 15 may be made to oppose the step portion 13c of the suspension support member 13.

Furthermore, parts in which the lower plate 15 is joined to the suspension support members 13 and 13 by means of the bolts 29 and 29 and the bolts 30 and 30 may be joined via the second joint part B.

Moreover, in the embodiment the front subframe 11 is illustrated, but the present invention may be applied to a rear subframe.

The invention claimed is:

1. An automobile subframe in which outer edges, in a vehicle width direction, of a main body part formed from an upper plate and a lower plate superimposed on one another and inner edges, in the vehicle width direction, of a pair of suspension support members disposed on opposite sides, in the vehicle width direction, of the main body part are each joined via a joint part extending in a vehicle body fore-and-aft direction, wherein the joint part comprises a first joint part in which one of the upper plate and the lower plate is directly superimposed on and joined to the associated suspension support member, and a second joint part in which the other of the upper plate and the lower plate is directly superimposed on and joined to the associated suspension support member, wherein at the first and second joint parts, the upper plate and the lower plate are superimposed on the associated suspension support member from a same side as each other and joined to the associated suspension support member by friction-stir welding which is conducted in a same direction as each other, the first joint part and the second joint part extend in the vehicle body fore-and-aft direction without overlapping each other, when the one of the upper plate and the lower plate is superimposed on the associated suspension support member, there are formed a superimposed part at which the one of the upper plate and the lower plate and the associated suspension support member are superimposed on one another and an abutment part at which the one of the upper plate and the lower plate and the associated suspension support member are abutted against each other so as to be flush, when the other of the upper plate and the lower plate is superimposed on the associated suspension support member, there is formed an extended part at which the other of the upper plate and the lower plate is extended to a position outwardly of the abutment part in the vehicle width direction, and the first joint part is formed at the superimposed part and the second joint part is formed at the extended part.

2. The automobile subframe according to claim 1, wherein of the upper plate and the lower plate, an outer edge in the vehicle width direction of at least the plate that is closer to the suspension support member opposes a step portion formed on the associated suspension support member.

3. The automobile subframe according to claim 1, wherein front and rear edges of the upper plate and the lower plate are joined to each other via a third joint part extending in the vehicle width direction.

4. The automobile subframe according to claim 1, wherein the main body part is a hollow structure having a space between the upper plate and the lower plate.

5. The automobile subframe according to claim 1, wherein the upper plate and the lower plate are joined to each other via a fourth joint part which is provided at a position adjacent to and inwardly of one of the first and second joint parts in the vehicle width direction.

* * * * *